US008823736B2

(12) United States Patent  
Barringer et al.

(10) Patent No.: US 8,823,736 B2  
(45) Date of Patent: Sep. 2, 2014

(54) GRAPHICS TILING ARCHITECTURE WITH BOUNDING VOLUME HIERARCHIES

(75) Inventors: Rasmus Barringer, Helsingborg (SE); Carl Johan Gribel, Lund (SE); Aaron Lefohn, Kirkland, WA (US); Tomas G. Akenine-Möller, Lund (SE)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 13/354,712

(22) Filed: Jan. 20, 2012

(65) Prior Publication Data

US 2013/0187947 A1 Jul. 25, 2013

(51) Int. Cl.  
*G09G 5/00* (2006.01)

(52) U.S. Cl.  
USPC .......................... 345/629; 345/418; 345/541

(58) Field of Classification Search  
CPC .............................. G06T 17/005; G06T 15/40  
USPC .......................................... 345/629, 418, 541  
See application file for complete search history.

(56) References Cited

U.S. PATENT DOCUMENTS 6,704,026 B2 * 3/2004 Kurihara et al. ............... 345/629  
7,969,436 B1 * 6/2011 Greene et al. ................. 345/422  
8,065,288 B1 * 11/2011 Garland et al. ................ 707/706  
2008/0180440 A1 * 7/2008 Stich ............................... 345/426  
2009/0259780 A1 * 10/2009 Hsu ................................. 710/63

OTHER PUBLICATIONS

Reshetov "Multi-Level Ray Tracing Algorithm"; Copyright © 2005 by the Association for Computing Machinery; p. 1182.*  
Udeshi "Towards Interactive Photorealistic Rendering of Indoor Scenes: A Hybrid Approach"; Dept. of Computer Science; 1999—Springer; p. 11.*  
Gribel, Carl J., et al., "High-Quality Spatio-Temporal Rendering using Semi-Analytical Visibility", ACM Transactions on Graphics (SIGGRAPH), vol. 30, No. 4, pp. 54:1-54:11, Aug. 2011.

* cited by examiner

*Primary Examiner* — Maurice L McDowell, Jr.  
(74) *Attorney, Agent, or Firm* — Trop, Pruner & Hu, P.C (57) ABSTRACT

In some embodiments, tile lists may be avoided by storing the geometry of a scene in a bounding volume hierarchy (BVH). For each tile, the bounding volume hierarchy is traversed. The traversals continued only into children nodes that overlap with the frustum on the tile. By relaxing the ordering constraint of rendering primitives, the BVH is traversed such that nodes that are closer to the viewer are traversed first, increasing the occlusion culling efficiency in some embodiments. Rendering the full scene between the central processing cores and the graphics processor may be done through a shared memory in some embodiments.

51 Claims, 6 Drawing Sheets

GRAPHICS TILING ARCHITECTURE WITH BOUNDING VOLUME HIERARCHIES

BACKGROUND

This relates generally to graphics processing.

In graphics processing, sort-middle or tiling architectures may be advantageous with respect to power consumption.

A sort-middle architecture works by first performing vertex processing so that the screen space positions on each processed triangle are known. The screen space pixels are divided into non-overlapping tiles that usually are rectangles of pixels. Each tile has a list of triangle pointers that point to triangles overlapping the tile. These tile lists are created by processing all triangles, and adding a triangle pointer to each tile that overlaps a particular triangle.

When all of the triangles have been processed and all the tile lists have been fully constructed, each tile can then be backend processed. This means that the triangles from the tile are rasterized to that tile. One advantage of tiled processing arises from the fact that a processing core can work on a tile independently of other cores and tiles, enabling relatively straightforward parallel processing in the backend. In addition, since a core only works on one tile at a time, the frame buffer memory for that tile can be relatively small and relatively fast local memory. In general, this may save memory bandwidth because all frame buffer accesses can be performed on this local memory. The tile is loaded and stored from external memory once per tile.

One disadvantage involves the need to create tile lists and the associated increased memory bandwidth. Also, in rasterizing the tile, the tile lists need to be read again. In addition, all the tile lists are kept in memory at the same time, which means there is a risk of running out of memory. In these cases, the architecture needs to detect when it runs out of memory and then rasterize a first part of the triangles while spilling current frame buffer content to external memory and then finishing the processing of all tiles. Then the remaining triangles are processed in the same manner, except that the same buffer content is read in from external memory before rasterization can begin. The spilling process is cumbersome and consumes memory bandwidth, slowing down processing.

BRIEF DESCRIPTION OF THE DRAWINGS

Some embodiments are described with respect to the following figures.

DETAILED DESCRIPTION

In some embodiments, the spilling process may be avoided, saving memory bandwidth usage. In some cases, the tiles and the triangle pointers can be avoided. Also, architectures may be exploited that share memory between the central processing unit and the graphics processor.

Thus in some embodiments, tile lists are avoided by storing the geometry of a scene in a bounding volume hierarchy (BVH). For each tile, the bounding volume hierarchy is traversed. The traversals continued only into children nodes that overlap with the frustum of the tile. By relaxing the ordering constraint of rendering primitives, we can traverse the BVH such that nodes that are closer to the viewer are traversed first, increasing the occlusion culling efficiency in some embodiments. The work of rendering the full scene can be shared between the central processing cores and the graphics processor, and results may be communicated through a shared memory in some embodiments.

A bounding volume hierarchy is an N-ary tree, where the leaves contain the actual geometry, such as triangles, and internal nodes contain a bounding volume that encloses all the geometry and the subtree below that internal node. Examples of useful bounding volumes include boxes and spheres.

Instead of building a tile list of triangle pointers for each tile, a bounding volume hierarchy is built of the geometry. Then the bounding volume hierarchy is traversed from the root node. Overlap tests are performed against each traversed node of the bounding volume hierarchy against the frustum of the current tile. If there is no overlap, then the geometry of the subtree of that node cannot reside in the current tile. Hence that node and its subtree cannot be further processed for the current tile. For those nodes whose bounding volumes overlap with the tile's frustum, the traversal continues.

Figure 1:
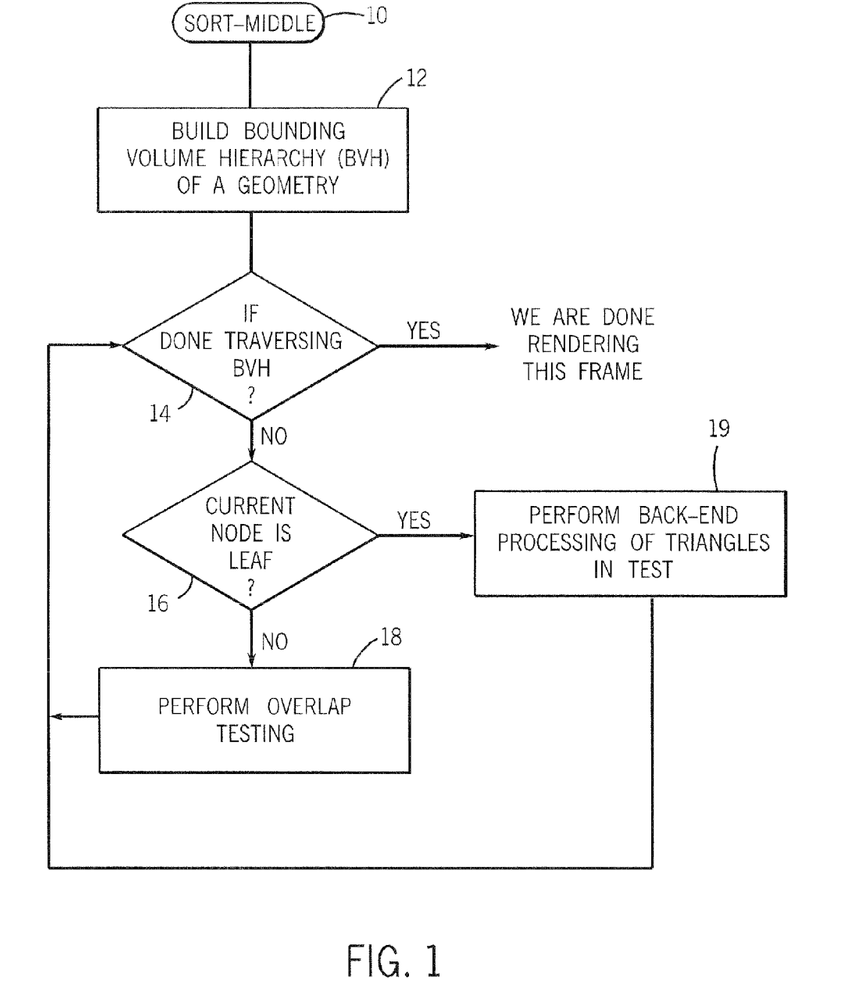
FIG. 1 is a flow chart for one embodiment of a present invention.

Thus referring to FIG. 1, a sort-middle architecture 10 may be implemented in software, firmware and/or hardware. In software and firmware embodiments it may be implemented by computer executed instructions stored in a non-transitory computer readable medium such as a magnetic, semiconductor or optical storage. In software and firmware embodiments, the sequence may be implemented by storing it in a storage within a graphics processor integrated circuit in one embodiment.

The sequence 10 begins by building a bounding volume hierarchy ("BVH") of all geometry in the scene as indicated in block 12. A check at diamond 14 determines if the bounding volume hierarchy traversal is complete. If so, the frame rendering is done. Otherwise, a check at diamond 16 determines whether the current node is a leaf node. If so, back-end processing is performed (block 19). Otherwise overlap testing is performed (block 18) and the flow iterates back to diamond 14.

Otherwise, the bounding volume hierarchy is traversed from the current node for each tile and the overlap tests are performed as indicated in block 14. Next a check at diamond 16 determines whether there is an overlap of a traversed node of the bounding volume hierarchy against the frustum of the current tile. If not, the processing of that node and its subtree has ended as indicated in block 18. Otherwise the processing traversal continues with the new current nodes being the children of the previous current node.

In some embodiments, the primitives are rendered in an order that achieves the best performance and the smallest power consumption. For better occlusion culling in early depth testing, the primitives are traversed in a front-to-back order. Hence when traversing the bounding volume hierarchy, it may be advantageous to traverse bounding volumes that are closer to the viewer over bounding volumes that are further away. This may produce better occlusion culling and early depth testing in some embodiments. During the traversal, when a leaf with geometric primitives is reached, those primitives are rasterized to the tile. Those primitives are then never visited again for the current tile. As such, there is no need for tile lists of triangle pointers. Spilling problems can be avoided in some embodiments. In addition, advantages of sort-middle architecture may still be achieved in the form of parallel processing of tiles. Each core can process a separate tile in parallel with other cores but each core may use a small and very fast memory for the local frame buffer of the tile in some embodiments.

Some architectures have a shared memory between central processing unit cores and graphics processors. The bounding volume hierarchy is built by a process that takes time and central processing unit cores are adapted to this because they are optimized to minimize latency and use branch predictions. Thus a bounding volume hierarchy may be built by the central processing unit cores directly into the memory shared between the processing cores and the graphics processor. Then the graphics processing cores may traverse the bounding volume hierarchy directly from that shared memory.

By having two or more frames in flight at the same time, the processing power of the central processing unit cores for building the bounding volume hierarchy and the processing power of the graphics processor core for traversing the bounding volume hierarchy and rasterizing the triangles are exploited at the same time.

Bounding volume hierarchy can also be built by the graphics processor or in other ways in other embodiments.

Figure 2:
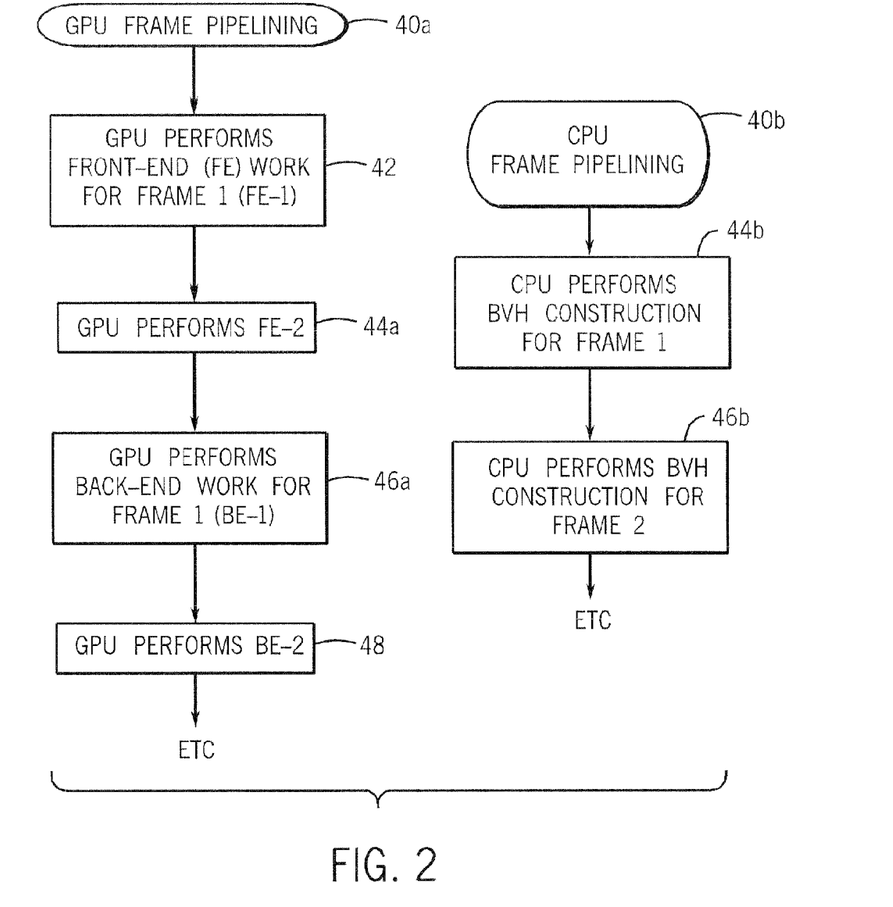
FIG. 2 is a flow chart for another embodiment to the present invention.

FIG. 2 includes side-by-side sequences for a graphics processing unit in the form of a graphics processing unit (GPU) frame pipelining sequence 40a and a central processing unit (CPU) frame pipelining sequence 40b. The sequence on the left may be run by the graphics processing unit and the sequence on the right may be run by the central processing unit. The two sequences are put side-by-side to indicate that the steps 44a and 44b may be run at the same time and the steps 46a and 46b may be run at the same time. Note that the GPU performs front-end (FE) work here, which produces the screen space (or camera space) coordinates of each primitive. These coordinates may be needed to build the BVH, which may be done on the CPU, and the final back-end (BE) rasterization and pixel shader exection etc. may be done by the GPU. Several different splits of this work are possible. For example, the CPU cores may perform all the FE work and the BVH work, and the GPU would only do the BE work then. Note that the BVH can also be built in world space in another embodiment. In addition, if the geometry is static (only the camera moves), we can build a BVH once, and then reuse it over subsequent frames (without rebuilding the BVH, because it will stay the same in world space). The sequences may be implemented in software, firmware and/or hardware. In software and firmware embodiments they may be implemented by computer executed instructions stored in a non-transitory computer readable medium such as a magnetic, optical or semiconductor storage. In some embodiments they may be part of the respective integrated circuits. Namely the pipelining sequence 40a may be part of the graphics processing unit and pipelining sequence 40b may part of a central processing unit. Alternatively, they can be part of a separate storage executed by the respective processor.

Thus referring to FIG. 2, a frame pipelining sequence 40a and 40b may be implemented by a graphics processing unit and any central processing unit in parallel. In the graphics processing unit, frame pipelining sequence 40a, the graphics processing unit performs front end work for a first frame (FE-1 work) as indicated in block 42. Then the graphics processing unit performs the frontend work for the next frame FE-2 as indicated in block 44a. Thereafter, the graphics processing unit performs backend work for frame 1 (BE-1) as indicated in block 46a. At some time thereafter the graphics processing unit performs the backend work for frame 2 (BE-2) and the flow continues.

In the central processing unit frame pipelining sequence 40b, the central processing unit performs the bounding volume hierarchy construction for frame 1 at the same time the graphics processing unit performs FE-2, as indicated in blocks 44a and 44b. Then the central processing unit performs the bounding volume hierarchy construction for frame 2 and at the same the graphics processing unit performs the backend work for frame 1 as indicated in blocks 46a and 46b.

The bounding volume hierarchy traversal may be made efficient for single instruction multiple data processing (SIMD) by traversing multiple nodes at the same time. For example, with a four-wide single instruction multiple data processor, the bounding volume hierarchy can be constructed so that each internal node in the tree can have four children as they are traversed using a shared instruction stream. Once one or more leaf nodes are found, the triangles within those leave nodes can be rasterized in order using conventional SIMD rasterization. With the binary tree where each internal node has two internal children, SIMD execution may be exploited by, instead of pushing nodes to visit in the future on a traversal stack, pushing the nodes toward a free SIMD lane or to the traversal stack if all SIMD lanes are full.

In some embodiments it may be advantageous to estimate the processing cost for each tile and then to split tiles that involve higher processing costs into smaller tiles. This may provide better load balancing in some embodiments.

For tile splitting, the bounding volume hierarchy is traversed down to a certain level, or to the point where the projected area of the bounding volume becomes small enough. Other metrics may also be used. Then, for each tile, the expected geometrical complexity due to geometry is accumulated in that bounding volume. This creates a "heat" or complexity map over the tiles in screen space. That heat map can then be used to select a tile size. For example, two simple tiles can be merged into a super tile and a more complex tile can be split into two smaller tiles to achieve better load balancing.

Figure 3:
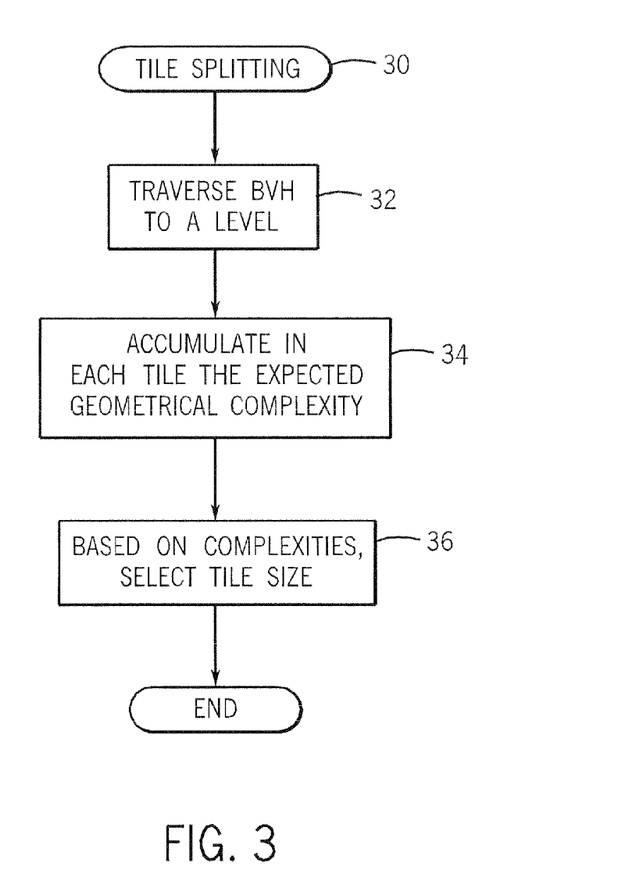
FIG. 3 is a flow chart for another embodiment to the present invention.

A tile splitting sequence 30 shown in FIG. 3 may be implemented in software, firmware and/or hardware. In software and firmware embodiments it may be implemented by computer executed instructions stored in a non-transitory computer readable medium such as a semiconductor, optical or magnetic memory. In some embodiments it may be implemented in the central processing unit integrated circuit.

Referring to FIG. 3, the sequence 30 begins at block 32 by traversing the bounding volume hierarchy to a certain level in one embodiment. In each tile, the expected geometric complexity is accumulated as indicated in block 34. Finally, based on that complexity, a tile size may be selected for each screen space region as indicated in block 36.

Figure 4:
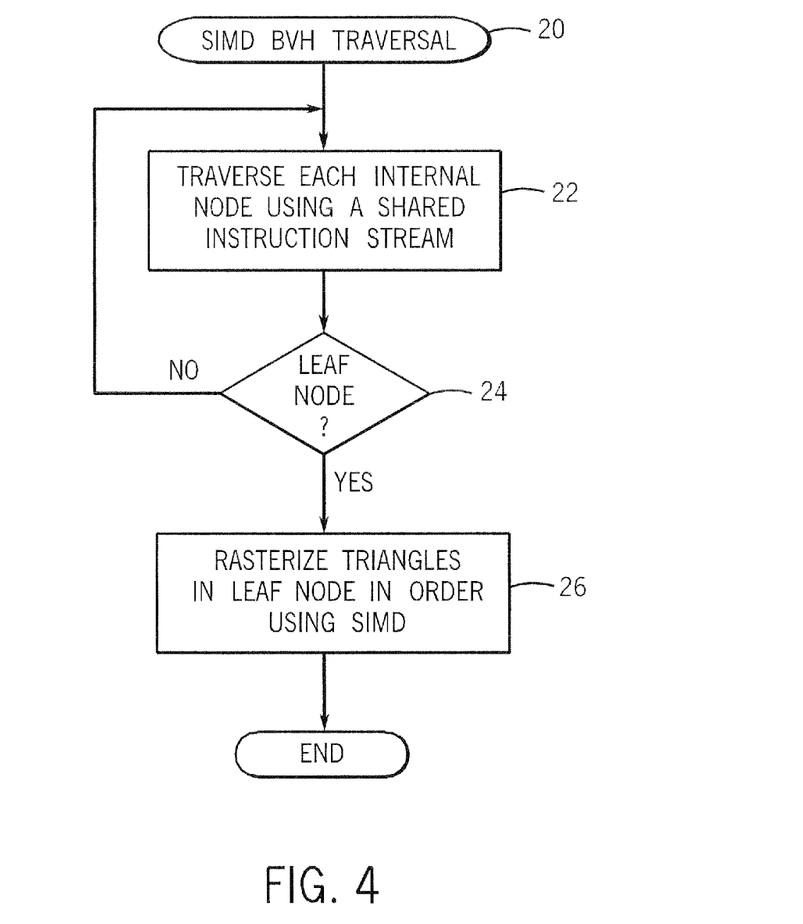
FIG. 4 is a flow chart for another embodiment of the present invention.

Referring to FIG. 4, a sequence 20 for SIMD bounding volume hierarchy traversal may be implemented by software, firmware and/or hardware. In software and firmware embodiments it may be implemented by computer executed instructions stored in a non-transitory computer readable medium such as a magnetic, optical or semiconductor storage. It may be implemented in some embodiments using a storage within a central processing unit core.

The sequence 20 begins by traversing multiple internal nodes using a shared instruction stream as indicated in block 22. If a leaf node is detected in diamond 24, the triangles are rasterized in the leaf node in order using SIMD as indicated in block 26. If a leaf node is not detected in diamond 24 then the traversal continues.

Figure 5:
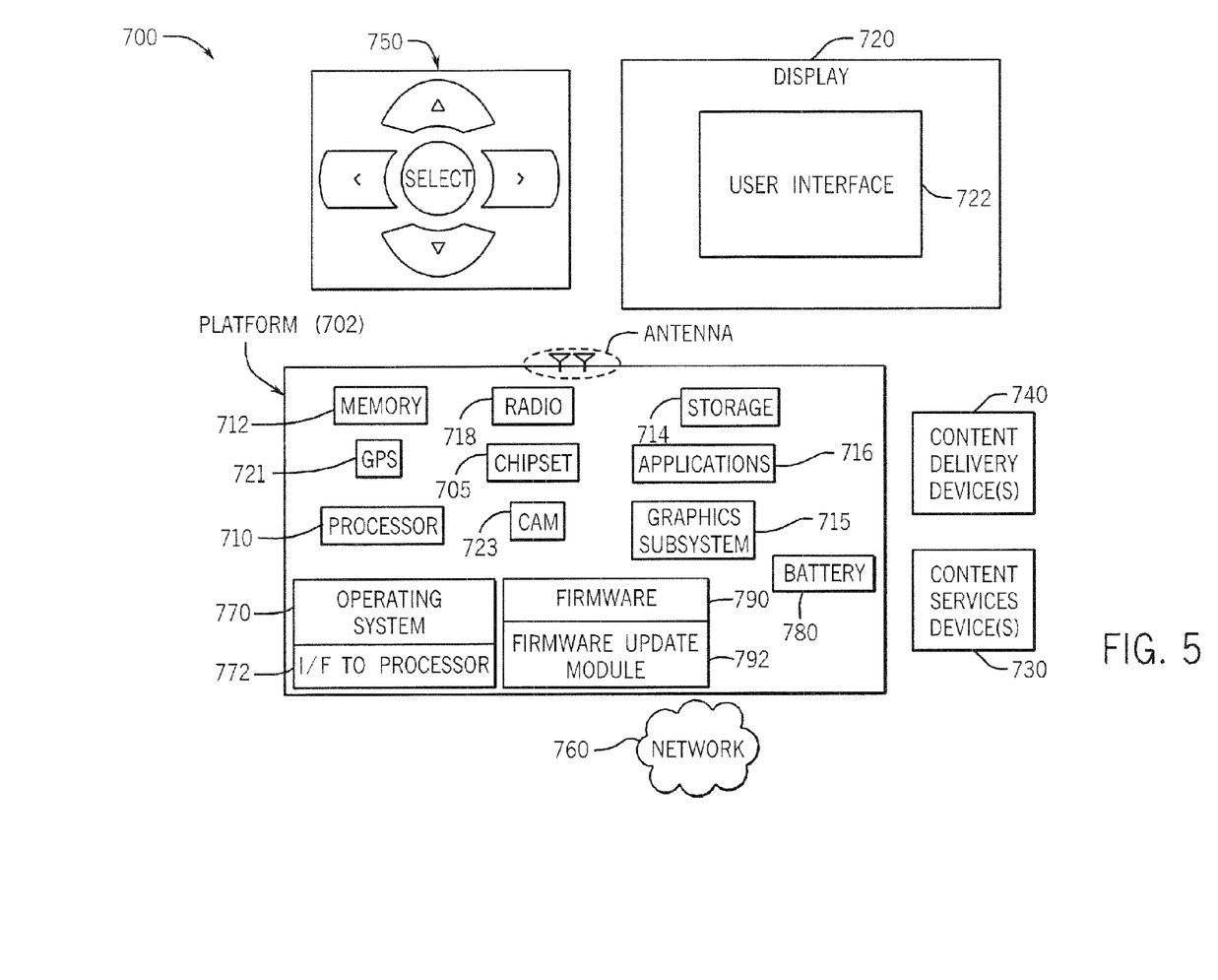
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile Internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 2 through 4 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 6:
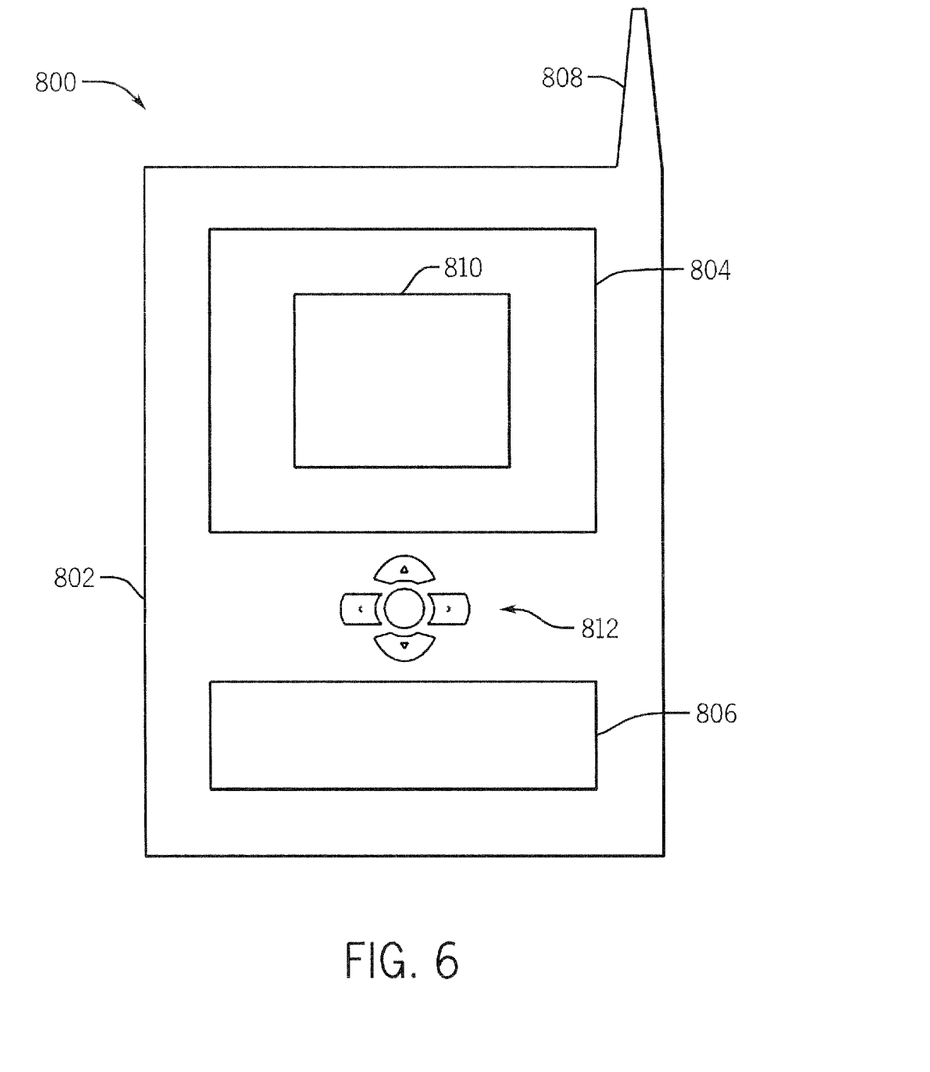
FIG. 6 is a front elevational view of an implementation of the system of FIG. 5 in accordance with one embodiment.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   storing, using a computer processor, scene geometry in a bounding volume hierarchy;
   traversing the bounding volume hierarchy for each tile of a plurality of tiles;
   continuing the traversal only into child nodes that overlap with a frustum of a tile; and
   performing back-end rasterization when a leaf node is reached.

2. The method of claim 1 including traversing the bounding volume hierarchy such that nodes that are closer to the viewer are traversed before nodes that are further away from the viewer.

3. The method of claim 1 including rendering a scene by sharing memory between a central processing unit and a graphics processor.

4. The method of claim 1 including performing front end processing of a frame in a graphics processing unit and at the same time performing bounding volume hierarchy construction in a central processing unit for a previous frame.

5. The method of claim 4 including performing back end work for the previous frame in the graphics processing unit at the same time the central processing unit performs bounding volume hierarchy construction for a subsequent frame.

6. The method of claim 1 including determining expected geometrical complexities for the plurality of tiles and based on said expected geometrical complexities, selecting a tile size.

7. The method of claim 6 including combining less complex tiles into a larger tile.

8. The method of claim 6 including splitting more complex tiles into at least two tiles.

9. The method of claim 1 including traversing an internal node using a shared instruction stream.

10. The method of claim 1 including detecting whether a node is a leaf node and rasterizing triangles in a leaf node in order using single instruction multiple data processing.

11. A non-transitory computer readable medium storing instructions to enable a processor to execute a sequence comprising:
   storing scene geometry in a bounding volume hierarchy;
   traversing the bounding volume hierarchy for each tile of a plurality of tiles;
   continuing the traversal only into child nodes that overlap with a frustum of a tile; and
   performing back-end rasterization when a leaf node is reached.

12. The medium of claim 11 including traversing the bounding volume hierarchy such that nodes that are closer to the viewer are traversed before nodes that are further away from the viewer.

13. The medium of claim 11 including rendering a scene by sharing memory between a central processing unit and a graphics processor.

14. The medium of claim 11 including performing front end processing of a frame in a graphics processing unit and at the same time performing bounding volume hierarchy construction in the central processing unit for a previous frame.

15. The medium of claim 14 including performing back end work for the previous frame in the graphics processing unit at the same time the central processing unit performs bounding volume hierarchy construction for a subsequent frame.

16. The medium of claim 11 including determining expected geometrical complexities for the plurality of tiles and based on said expected geometrical complexities, selecting a tile size.

17. The medium of claim 16 including combining less complex tiles into a larger tile.

18. The medium of claim 16 including splitting more complex tiles into at least two tiles.

19. The medium of claim 11 including traversing an internal node using a shared instruction stream.

20. The medium of claim 11 including detecting whether a node is a leaf node and rasterizing triangles in a leaf node in order using single instruction multiple data processing.

21. An apparatus comprising:
   a processor to store scene geometry in a bounding volume hierarchy, traverse the bounding volume hierarchy for each tile of a plurality of tiles, continue the traversal only into child nodes that overlap with a frustum of a tile, and perform back-end rasterization when a leaf node if reached; and
   a storage coupled to said processor.

22. The apparatus of claim 21 said processor to traverse the bounding volume hierarchy such that nodes that are closer to the viewer are traversed before nodes that are further away from the viewer.

23. The apparatus of claim 21 including a graphics processor and a central processing unit to render a scene by sharing memory between the central processing unit and the graphics processor.

24. The apparatus of claim 21 including a graphics processing unit to perform front end processing of a frame and at the same time a central processing unit to perform bounding volume hierarchy construction in the central processing unit for a previous frame.

25. The apparatus of claim 24 said graphics processing unit to perform back end work for the previous frame in the graphics processing unit at the same time the central processing unit performs bounding volume hierarchy construction for a subsequent frame.

26. The apparatus of claim 21, said processor to determine expected geometrical complexities for the plurality of tiles and based on said expected geometrical complexities, selecting a tile size.

27. The apparatus of claim 26, said processor to combine less complex tiles into a larger tile.

28. The apparatus of claim 26, said processor to split more complex tiles into at least two tiles.

29. The apparatus of claim 21, said processor to traverse an internal node using a shared instruction stream.

30. The apparatus of claim 21, said processor to detect whether a node is a leaf node and rasterizing triangles in a leaf node in order using single instruction multiple data processing.

31. The apparatus of claim 21 including an operating system.

32. The apparatus of claim 21 including a battery.

33. The apparatus of claim 21 including firmware and a module to update said firmware.

34. A method comprising:
   storing scene geometry in a bounding volume hierarchy;
   traversing the bounding volume hierarchy for each tile of a plurality of tiles;
   continuing the traversal only into child nodes that overlap with a frustum of a tile; and
   performing front end processing of a frame in a graphics processing unit and at the same time performing bounding volume hierarchy construction in a central processing unit for a previous frame.

35. The method of claim 34 including traversing the bounding volume hierarchy such that nodes that are closer to the viewer are traversed before nodes that are further away from the viewer.

36. The method of claim 34 including rendering a scene by sharing memory between a central processing unit and a graphics processor.

37. The method of claim 34 including performing back end work for the previous frame in the graphics processing unit at the same time a central processing unit performs bounding volume hierarchy construction for a subsequent frame.

38. The method of claim 34 including determining expected geometrical complexities for the plurality of tiles and based on said expected geometrical complexities, selecting a tile size.

39. The method of claim 38 including combining less complex tiles into a larger tile.

40. The method of claim 38 including splitting more complex tiles into at least two tiles.

41. The method of claim 34 including traversing an internal node using a shared instruction stream.

42. The method of claim 34 including detecting whether a node is a leaf node and rasterizing triangles in a leaf node in order using single instruction multiple data processing.

43. A method comprising:
   storing, using a computer processor, scene geometry in a bounding volume hierarchy;
   traversing the bounding volume hierarchy for each tile of a plurality of tiles;
   continuing the traversal only into child nodes that overlap with a frustum of a tile; and
   detecting whether a node is a leaf node and rasterizing triangles in a leaf node in order using single instruction multiple data processing.

44. The method of claim 43 including traversing the bounding volume hierarchy such that nodes that are closer to the viewer are traversed before nodes that are further away from the viewer.

45. The method of claim 43 including rendering a scene by sharing memory between a central processing unit and a graphics processor.

46. The method of claim 43 including performing front end processing of a frame in a graphics processing unit and at the same time performing bounding volume hierarchy construction in the central processing unit for a previous frame.

47. The method of claim 46 including performing back end work for the previous frame in the graphics processing unit at the same time the central processing unit performs bounding volume hierarchy construction for a subsequent frame.

48. The method of claim 43 including determining expected geometrical complexities for the plurality of tiles and based on said expected geometrical complexities, selecting a tile size.

49. The method of claim 48 including combining less complex tiles into a larger tile.

50. The method of claim 48 including splitting more complex tiles into at least two tiles.

51. The method of claim 43 including traversing an internal node using a shared instruction stream.

* * * * *